(12) United States Patent
Marquross

(10) Patent No.: US 9,410,821 B1
(45) Date of Patent: Aug. 9, 2016

(54) METERING DATA TRANSMITTER DEVICE

(71) Applicant: Moquey K'Seal Marquross, Fallbrook, CA (US)

(72) Inventor: Moquey K'Seal Marquross, Fallbrook, CA (US)

( * ) Notice: Subject to any disclaimer, the term of this patent is extended or adjusted under 35 U.S.C. 154(b) by 177 days.

(21) Appl. No.: 14/338,860

(22) Filed: Jul. 23, 2014

(51) Int. Cl.
*G08B 23/00* (2006.01)
*G01D 4/00* (2006.01)

(52) U.S. Cl.
CPC ..................... *G01D 4/002* (2013.01)

(58) Field of Classification Search
None
See application file for complete search history.

(56) References Cited

U.S. PATENT DOCUMENTS

2009/0146838 A1* 6/2009 Katz .................. G01D 4/006
340/870.02
2010/0188262 A1* 7/2010 Reymann ............... G01R 22/10
340/870.02
2012/0166233 A1* 6/2012 Wengrovitz ......... G06Q 10/063
705/7.11

* cited by examiner

*Primary Examiner* — Ojiako Nwugo
(74) *Attorney, Agent, or Firm* — Loyal McKinley Hanson

(57) ABSTRACT

A metering data transmitter device, for wirelessly communicating metering data from a utility meter to another location, includes an enclosure and an electronic circuit located at least partially within the enclosure. An input portion of the electronic circuit receives an electronic input signal from the utility meter that is indicative of metering data. A transmitter subcircuit portion of the electronic circuit, operating preferably in the 33 centimeter band, transmits a radio frequency output signal that is indicative of that metering data. The electronic circuit also includes a display subcircuit portion for displaying a visually discernible indication of the metering data (preferably a digital display). One embodiment receives the electronic input signal via electrical wiring while another embodiment receives the electronic input signal wirelessly (e.g., via a Bluetooth-type communication link). Preferably, a control subcircuit is provided for enabling a user to control the electronic circuit (e.g., the metering data display) manually.

6 Claims, 3 Drawing Sheets

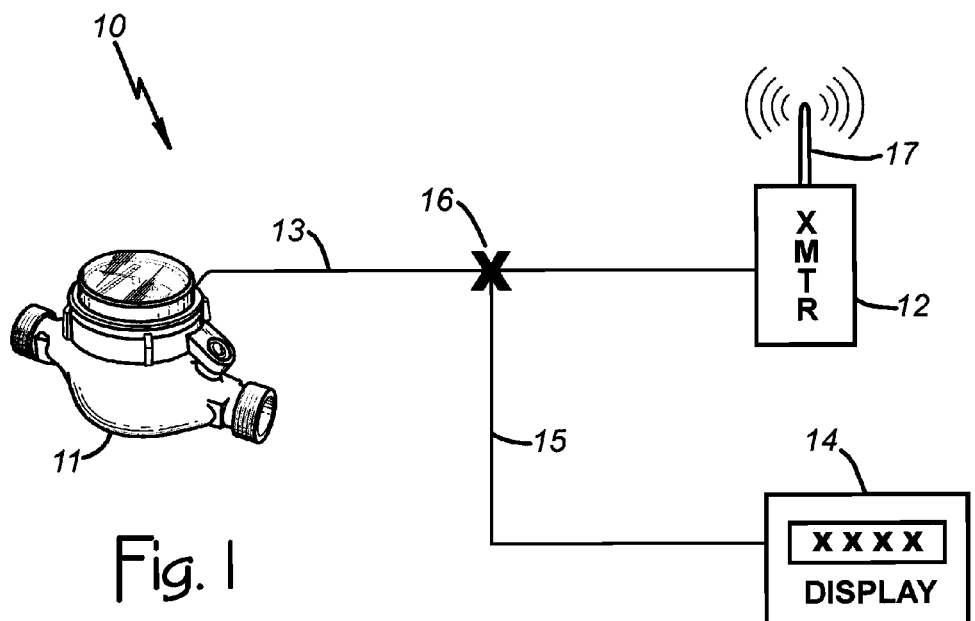
Fig. 1
Prior Art
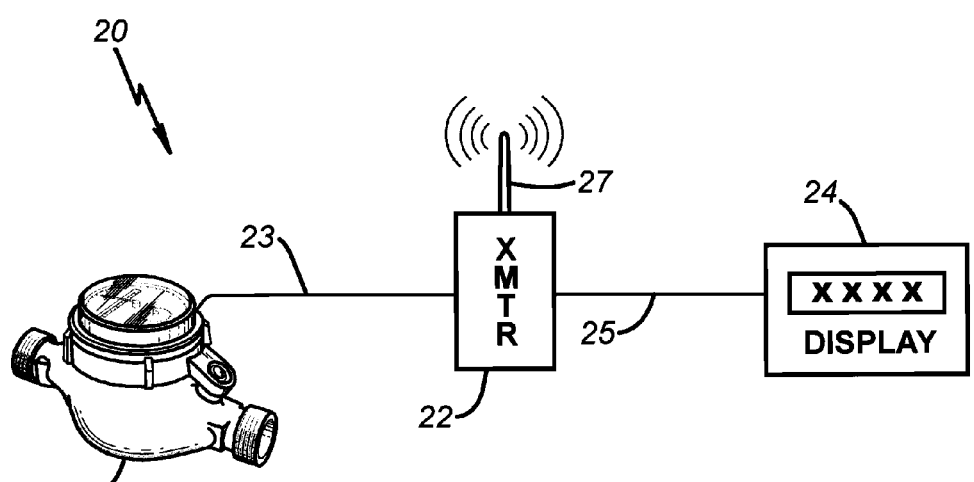
Fig. 2 - Prior Art

METERING DATA TRANSMITTER DEVICE

BACKGROUND OF THE INVENTION

1. Technical Field

This invention relates generally to flow and volume measurement, utility meters, sub-metering, and the like. It relates more particularly to a metering data transmitter device that receives metering data from a meter and transmits that metering data wirelessly to another location.

2. Description of Related Art

The term "meter" herein includes any of various meters that provide an indication of the volume, quantity, and/or flow. Such a meter is often used by a utility provider, for example, in order to determine usage by a customer or other user for billing purposes. It is then often referred to as a "utility meter." It is the most commonly used measurement system for measuring the flow of water, gas, electricity, and/or other utilities supplied to houses.

During operation of a typical utility meter (e.g., a water meter type of utility meter), fluid moving through the meter strikes a nutating disk within the meter. The nutating disk is mounted eccentrically so that it must "wobble" or nutate in response to the passing fluid. As the disk nutates, it actuates a gearing and register arrangement that provides a direct indication on a visually discernible meter display of the volume of fluid passing through the meter. The nutating disk usually actuates a micro reed switch also, in order to thereby provide a remotely usable electrical pulse signal (i.e., switch closures) that is indicative of flow rate and/or volume. The remotely usable electrical pulse signal is coupled by wiring to another location in order to provide metering data that is indicative of usage information.

In a typical installation, the electrical pulse signal (i.e., an electrical input signal) is coupled by a first electrical wiring arrangement (i.e., wireless-transmitter wiring) to a wireless transmitter for transmission of the metering data to another location (e.g., a sub-metering data collection or retransmission hub). Frequently, the electrical pulse signal is also coupled by a second electrical wiring arrangement (i.e., remote-display wiring) to a remote display unit that provides a visually discernible display of usage information at a location remote to the meter. The remote-display wiring is installed with, or added to, a meter installation to help alleviate user inconvenience experienced in a situation where the display on the meter is not readily viewable by the user, The remote display unit is located in a location where the user can more readily view it.

Installation of the remote display unit is commonly accomplished by either of two methods. The first method involves splicing a Y-connection in the wireless-transmitter wiring that couples the electrical pulse signal (i.e., the electrical input signal) to the wireless transmitter. The remote-display wiring is spliced into the remote-display wiring with what is often called a "Y-connection." The second method involves connecting the remote-display wiring to a terminal on the wireless transmitter that is provided for that purpose.

Either of those two methods involves certain complexity and expense. Moreover, damaged or otherwise faulty components and/or wiring can result in the number of pulse counts of the electrical pulse signal that are received by the wireless transmitter (and thereby the usage information received by the wireless transmitter) differing significantly from that received at the remote display unit. As a result, customer billing can be significantly inconsistent with the reading on the remote display unit. Billing can be significantly different from what the customer expects.

SUMMARY OF THE INVENTION

In view of the foregoing, it is a primary object of the present invention to alleviate the foregoing concerns. The present invention achieves this objective, predicated on the inventor's recognition of a source of billing inconsistencies, by providing a metering data transmitter device that includes a built-in remote display. The complexity and expense of providing and installing a remote display unit separate from the metering data transmitter is avoided, along with the wiring-related and multi-component-related inconsistent usage information and the questionable customer billing that often results.

To paraphrase some of the more precise language appearing in the claims and further introduce the nomenclature used, a metering data transmitter device constructed according to the present invention, for wirelessly communicating metering data from a utility meter to another location, includes an enclosure and an electronic circuit located at least partially within the enclosure. An input portion of the electronic circuit receives an electronic input signal from the utility meter that is indicative of metering data, while a transmitter subcircuit portion of the electronic circuit transmits a radio frequency output signal that is indicative of that metering data.

According to a major aspect of the invention, the metering data transmitter device includes a display subcircuit portion for displaying a visually discernible indication of the metering data. The display subcircuit is an integral component of the metering data transmitter device, instead of being a separate unit. Preferably, the display subcircuit includes a digital display that is visible from the exterior of the enclosure of the transmitter device. One embodiment receives the electronic input signal via electrical wiring while another embodiment receives the electronic input signal wirelessly (e.g., via a Bluetooth-type communication link). Preferably, a control subcircuit is provided for enabling a user to control the electronic circuit manually.

BRIEF DESCRIPTION OF THE DRAWINGS

FIG. 1 of the drawings is a diagrammatic representation of a first meter installation (e.g., a first sub-metering installation) that is configured according to the prior art using a prior art wireless transmitter and a prior art remote display unit having remote-display wiring that is spliced into the wireless-transmitter wiring;

FIG. 2 is a diagrammatic representation of a second meter installation (e.g., a second sub-metering installation) that is configured according to the prior art with the remote-display wiring connected to a terminal on the prior art wireless transmitter;

DESCRIPTION OF THE PREFERRED EMBODIMENTS

Figure 3:
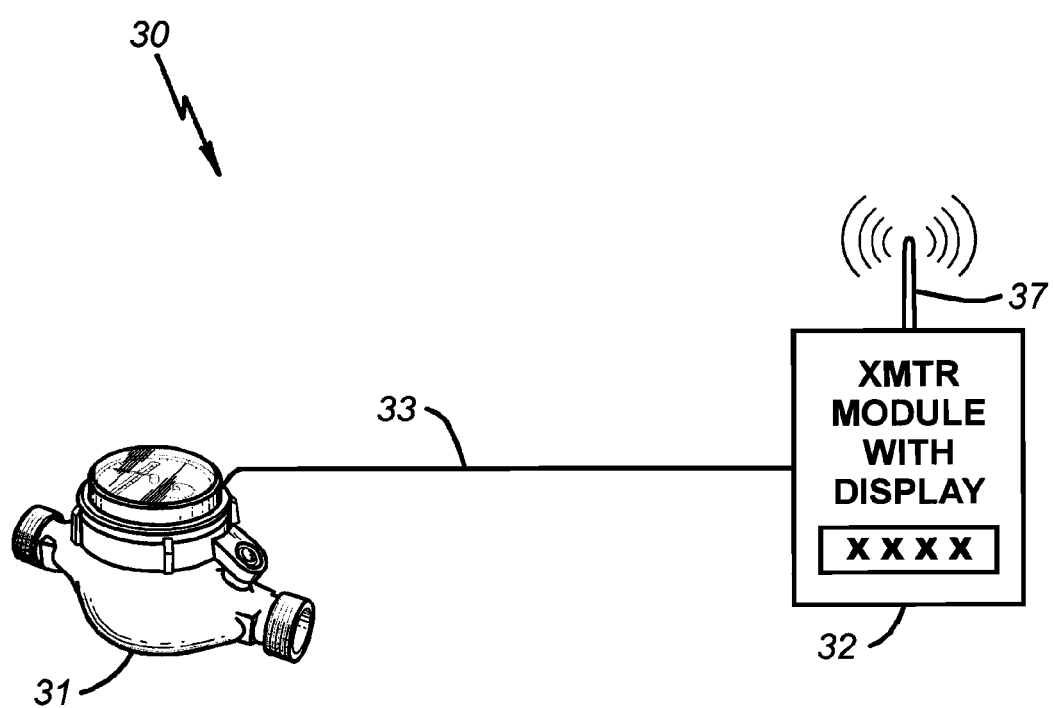
FIG. 3 is a diagrammatic representation of a third meter installation (e.g., a third sub-metering installation) that uses a metering data transmitter device constructed according to the present invention, instead of separate wireless transmitter and remote display unit components.
Figure 4:
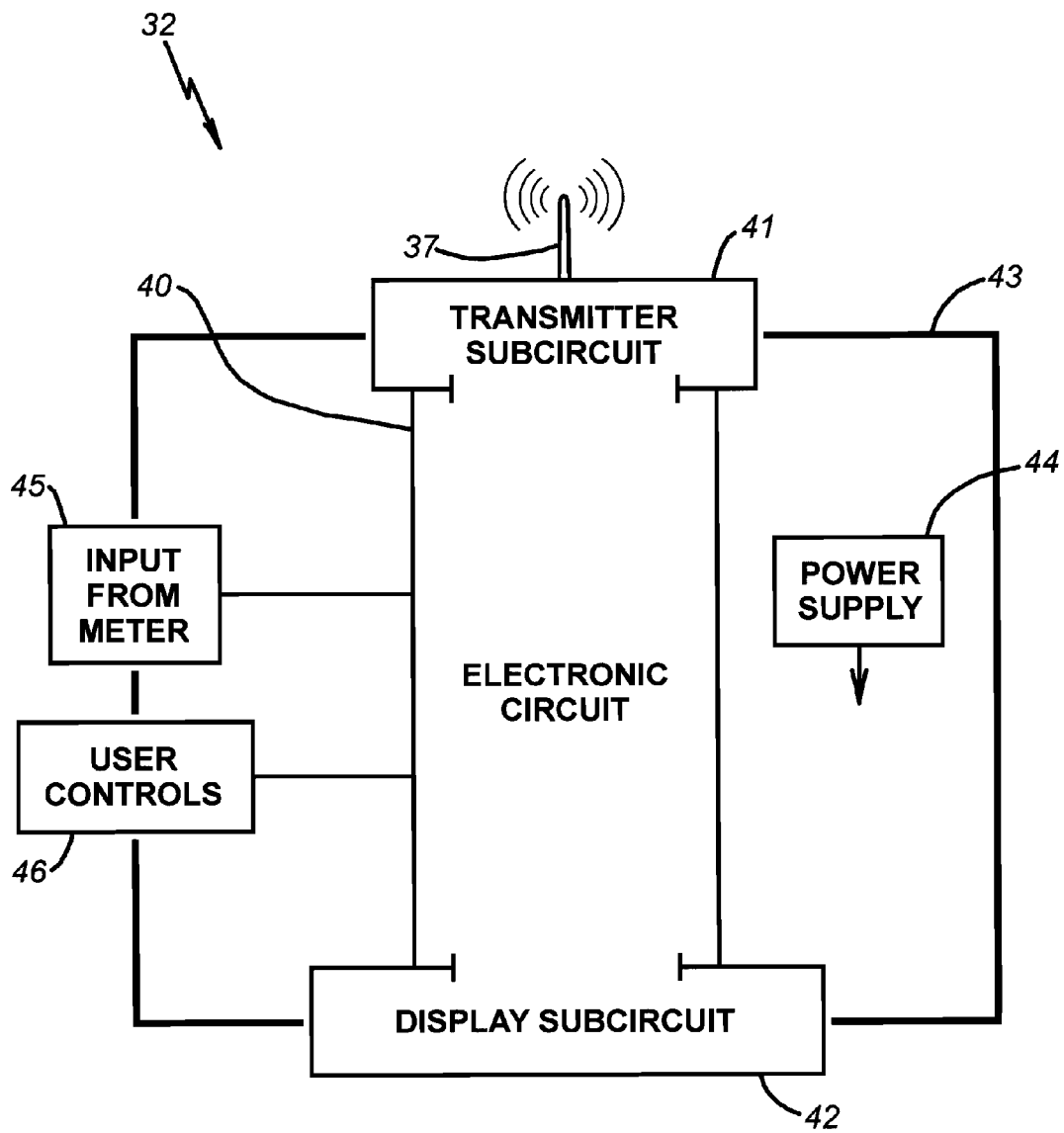
FIG. 4 is a block diagram of the metering data transmitter device shown in FIG. 3.

FIGS. 1, 2, 3, and 4 illustrate various aspects of the present invention. First, consider FIG. 1. It shows a first prior art meter installation 10 in which a meter 11 (e.g., a known type of meter) produces an electrical pulse signal that is indicative of flow rate and/or volume (i.e., usage information). The electrical pulse signal (e.g., produced in a known way by momentary switch closures or other digital output) is coupled to a metering data transmitter 12 via wireless-transmitter wiring 13.

The electrical pulse signal is also coupled to a known type of remote display unit 14 that is connected via remote-display wiring 15 to a Y-connection 16 created by splicing the remote-display wiring 15 into the wireless-transmitter wiring 13. The Y-connection 16 is depicted in FIG. 1 by a large, bold letter "X." So arranged, the metering data transmitter 12 transmits the usage information to another location as depicted in FIG. 1 by an antenna component 17, while the remote display unit 14 provides a visually discernible readout in a location remote from the meter 11 where the user can more readily view it. Typically, the remote display unit 14 includes a digital display as depicted in FIG. 1 by the four Xs of the component 14 (i.e., "XXXX").

FIG. 2 shows a second prior art meter installation 20 that is generally similar to the first prior art meter installation 10. A known type of utility meter 21 produces an electrical pulse signal indicative of usage information, and the electrical pulse signal is coupled to a metering data transmitter 22 via wireless-transmitter wiring 23 for retransmission via an antenna component 27. The electrical pulse signal is also coupled to a known type of remote display unit 24, but a Y-connection is not used. Instead, the metering data transmitter 22 includes a terminal strip (not shown) to which remote-display wiring 15 of the remote display unit 24 is connected.

Both of the above two prior art installations involve certain complexity and expense. In addition, damaged or otherwise faulty components and/or wiring can result in the billing inconsistencies mentioned previously. Billing can be significantly different compared to that which the customer expects.

Examples of existing, commercially available, utility meters include the following:
1. The "T-10" residential water meter available from Neptune Technology Group, Inc. of Tallassee, Ala.
2. The "IP-68" electrical output registers available from Master Meter, Inc. of Mansfield, Tex.
3. The "SingleMag," "VersaMag," and "MultiMag" water meters available from Norgas Controls, Inc. of Fairfield, Ohio.
4. The "QLC Smart Meters" available from Quadlogic Controls Corporation of Long Island City, N.Y.

Examples of existing, commercially available, metering data transmitters include the following:
1. The "metering data transceiver" (MDT) available from Tehama Wireless Design Group of Berkeley, Calif.
2. The model "DSTx-5" metering data transmitter available from Cereniti Datasense Networks Inc. of Indianapolis, Ind.
3. The model "EN1501" pulse counting metering data transmitter available from Inovonics Wireless Corporation of Louisville, Colo.

Examples of existing, commercially available, remote display units include the following:
1. The model "RCM-100" remote display unit available from MARS Company of Ocala, Fla.
2. The "Digi-Read" remote display unit available from Infinity Metering Company, Inc. of Claremore, Okla.
3. The models "MDU 2.1" and "MDU 2.2" remote display units available from Meter Reading Systems, Inc. of Elk Grove, Calif.

Turning now to FIG. 3, it shows a meter installation 30 constructed according to the present invention. The meter installation 30 includes a meter 31 (e.g., a known type of utility meter) that produces an electrical pulse signal indicative of flow rate and/or volume (i.e., usage information). The electrical pulse signal (e.g., produced by momentary closures of a reed switch as it responds to a nutating disc arrangement) is coupled from the meter 31 to a metering data transmitter device 32 via a wireless-transmitter communication link 33 (e.g., two-wire, wireless-transmitter wiring).

Unlike existing meter installations with prior art metering data transmitters, the meter installation 30 includes a metering data transmitter device 32 constructed according to the present invention to include an electronic circuit having both a transmitter subcircuit and a display subcircuit. The transmitter subcircuit retransmits the usage information wirelessly to another location (e.g., a data collection hub), as depicted by an antenna 37 in FIG. 3. The display subcircuit drives a visually discernible display representing usage information (e.g., a digital display as depicted in FIG. 3 by the four Xs of the device 32). In that way, the meter installation 30 avoids the complexity and expense of providing and installing a remote display unit separate from the metering data transmitter, along with avoiding the wiring-related and multi-component-related inconsistent usage information and the questionable customer billing that often results with prior art installations.

The communication link 33 from the meter 31 to the metering data transmitter device 32 may take other forms than two-wire, wireless-transmitter wiring. It may, for example, take the form of a Bluetooth-type communications link. "BLUETOOTH" is a trademark of Bluetooth Sig, Inc. of Kirkland, Wash. for various products using a standard wire-replacement communications protocol that is primarily designed for low-power consumption, with a short range based on a low-cost transceiver (microchip) in each device. As used herein, a "Bluetooth-type communication link" is a wireless link having suitable components for exchanging data over short distances using radio frequency (RF) in an ultra high frequency (UHF) range.

Based upon the foregoing and subsequent descriptions, a person having ordinary skill in the art (i.e., a PHOSITA) can readily implement a meter installation having a metering data transmitter device constructed according to the invention. As shown in the block diagram of FIG. 4, the illustrated metering data transmitter device 32 includes an electronic circuit 40 that is configured for that purpose. It is so "configured" in the sense that it includes electronic components interconnected to function as described. It includes a combination of a transmitter subcircuit 41 that is modeled in part after the circuitry of an existing metering data transmitter, and a display subcircuit 42 that is modeled in part after the circuitry of an existing remote display unit. Of course, a PHOSITA can use other circuitry instead.

The electronic circuit 40 is housed in an enclosure 43 that is a component separate from the utility meter with which it is used. The enclosure 43 preferably takes the form of a plastic or metal enclosure that is generally similar in size and construction to the enclosures of existing metering data transmitters and remote display units. As a part of the electronic circuit 40, the enclosure 43 also houses a power supply circuit represented by a block 44 that provides electric power (e.g., battery powered or line powered) to the electronic circuit 40. An input port is provided on the enclosure 43 for receiving an electrical pulse input signal over a communications link from a meter (e.g., the meter 31 in FIG. 3), as represented by a block 45 in FIG. 4 (e.g., wired and/or wirelessly). Preferably, user controls are also provided for enabling a user to control the metering data transmitter device 32, as represented by a block 46.

To use the metering data transmitter device 32, the user readies the communication link coupling the electrical pulse signal from the meter 31 to the electronic circuit 40 via the block 45 (e.g., a wired or wireless communications link). Then, using the block 46, the user turns the electronic circuit 40 to an ON state. Once that is accomplished, the electronic circuit 40 operates in a known way to receive the electrical pulse signal via the block 45 and transmit the usage information to another location via the antenna 37. Typically, the transmitter subcircuit 41 is configured to do so using a governmentally allocated and approved RF signal (e.g., in the 33 centimeter band spanning 902 MHz to 928 MHz or the 70-centimeter band spanning 420 MHz to 450 MHz) and a very low power output level not exceeding one watt. While transmitting the usage information to another location that way, the electronic circuit 40 also functions by providing a visually discernible readout (e.g., preferably a digital display) of usage information via the display subcircuit 42. Typically, the only user control is to show the current reading (i.e., show or activate the LCD display; the other functions of the transmitter device 32 are typically automatic).

Thus, the invention provides a meter installation and a metering data transmitter device that alleviate concerns associated with the prior art. Although an exemplary embodiment has been shown and described, a person having ordinary skill in the art may make many changes, modifications, and substitutions without necessarily departing from the spirit and scope of the invention. As for the specific terminology used to describe the exemplary embodiments, it is not intended to limit the invention; each specific term is intended to include all technical equivalents that operate in a similar manner to accomplish a similar purpose or function.

What is claimed is:

1. A metering data transmitter device, comprising:
   an enclosure;
   an electronic circuit located at least partially within the enclosure;
   an input portion of the electronic circuit that functions as means for receiving an electronic input signal from a utility meter that is indicative of metering data;
   a transmitter subcircuit portion of the electronic circuit that functions as means for transmitting a radio frequency output signal that is indicative of said metering data; and
   a display subcircuit portion of the electronic circuit that functions as means for displaying a visually discernible indication of the metering data;
   wherein the enclosure is a structure separate from the utility meter;
   wherein the input portion of the electronic circuit is configured to receive the electronic input signal indicative of metering data from the utility meter via electrical wiring; and
   wherein the display subcircuit portion includes a digital display.

2. A metering data transmitter device as recited in claim 1, wherein the electronic circuit includes a control subcircuit portion for enabling a user to control the electronic circuit manually.

3. A metering data transmitter device as recited in claim 1, wherein the electronic circuit is battery powered.

4. A metering data transmitter device as recited in claim 1, wherein the transmitter subcircuit portion operates at a frequency in a range of 902 MHZ to 928 MHZ.

5. A metering data transmitter device as recited in claim 1, wherein the transmitter subcircuit portion operates at a frequency in a range of 420 MHZ to 450 MHZ.

6. A meter installation, comprising:
   a utility meter; and
   a metering data transmitter device that is a structure separate from the utility meter, said metering data transmitter being coupled via wiring to the utility meter;
   wherein the metering data transmitter device comprises:
   an enclosure that is a structure separate from the utility meter;
   an electronic circuit located at least partially within the enclosure;
   an input portion of the electronic circuit that functions as means for receiving an electronic input signal from a utility meter that is indicative of metering data, said input portion of the electronic circuit being configured and connected to the utility meter by wiring in order to receive the electronic input signal indicative of metering data from the utility meter via the electrical wiring;
   a transmitter subcircuit portion of the electronic circuit that functions as means for transmitting a radio frequency output signal that is indicative of said metering data; and
   a display subcircuit portion of the electronic circuit that functions as means for displaying a visually discernible indication of the metering data, said display subcircuit portion including a digital display.

\* \* \* \* \*